(12) United States Patent
Pinnavaia et al.

(10) Patent No.: US 7,074,469 B2
(45) Date of Patent: Jul. 11, 2006

(54) COMPOSITE COMPOSITIONS WITH BARRIER PROPERTIES AND METHODS FOR THE PREPARATION THEREOF

(75) Inventors: Thomas J. Pinnavaia, East Lansing, MI (US); Konstantinos Triantafyllidis, Thessaloniki (GR); Peter C. LeBaron, Midland, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 248 days.

(21) Appl. No.: 10/393,123

(22) Filed: Mar. 20, 2003

(65) Prior Publication Data

US 2004/0185201 A1 Sep. 23, 2004

(51) Int. Cl.
*B29D 22/00* (2006.01)
*B29D 23/00* (2006.01)
*B32B 1/08* (2006.01)

(52) U.S. Cl. .................. 428/36.1; 428/36.3; 428/36.6; 428/297.4; 428/306.4; 428/368; 442/43; 442/127

(58) Field of Classification Search ............... 428/36.1, 428/36.3, 35.7, 35.2, 36.6, 36.7, 34.2, 34.3, 428/297.4, 301.4, 365, 401, 368; 442/43, 442/58, 61, 79, 85, 86, 127, 153–163

See application file for complete search history.

(56) References Cited

U.S. PATENT DOCUMENTS

| 6,337,046 B1 | 1/2002 | Bagrodia et al. |
| 6,596,807 B1 * | 7/2003 | Oshita et al. ............... 524/557 |
| 2002/0006518 A1 | 1/2002 | Lustig |

FOREIGN PATENT DOCUMENTS

WO WO 00/40404 7/2000

OTHER PUBLICATIONS

Kirk Othmer, vol. 16, pp. 768-825 (1981).

* cited by examiner

*Primary Examiner*—Michael C. Miggins
(74) *Attorney, Agent, or Firm*—Ian C. McLeod

(57) ABSTRACT

Compositions including a fabric layer with a water-insoluble polymer impregnated into the fabric layer to provide sheets are described. In particular, the sheet composites have a permeability to oxygen in the direction perpendicular to the sheet that is less than one-tenth the transmission rate for the fabric layer alone and less than one-fifth the transmission rate for the polymer alone without the fabric layer.

14 Claims, 10 Drawing Sheets

COMPOSITE COMPOSITIONS WITH BARRIER PROPERTIES AND METHODS FOR THE PREPARATION THEREOF

STATEMENT REGARDING FEDERALLY SPONSORED RESEARCH OR DEVELOPMENT

The research leading to this invention was sponsored in part by the National Aeronautic and Space Administration through Grant Number NAG3-2472. The U.S. government has certain rights to the invention.

CROSS-REFERENCES TO RELATED APPLICATIONS

Not Applicable.

Reference to a "Computer Listing Appendix Submitted on a Compact Disc"
Not Applicable.

BACKGROUND OF THE INVENTION (1) Field of the Invention

The present invention relates to thin sheet composite compositions with improved barrier properties particularly in reference to oxygen and hydrogen. In particular, the present invention relates to compositions including a fabric layer with a polymer impregnated into the fabric layer to provide sheets. In particular, the sheet composites have a permeability to oxygen in the direction perpendicular to the sheet that is less than one-tenth the transmission rate for the fabric layer alone and less than one-fifth the transmission rate for the polymer alone without the fabric layer.

(2) Description of Related Art

The prior art has described various polymer and particle and/or fiber composites which have a limited transmission rate to gases, particularly oxygen, and water. The problem is that the oxygen transmission rate of these prior art composites is either significantly greater than 100 cc.mil/$m^2$.day.atm (6.45 cc.mil/100 in/day) or less than five times smaller than the permeability of the pristine polymer alone. Furthermore the prior art particle composites have to be coated as a liquid suspension onto a polymer substrate through dip coating or spraying processes and dried or cured as in PCT/US00/03802. These coating methodologies inevitably lead to less than optimal particle orientations which compromise the barrier properties toward small molecules. Theoretical modeling studies by Nagy and Duxbury in Physical Review E66, 2002, 020802(R) have shown that for typical polymer composites reinforced by dispersed clay nanolayers with a width to thickness aspect ratio of 128, even small mis-alignments of the platelets causes the permeability to be dramatically reduced and far lower than the barrier properties expected on the basis of well-aligned particles. Thus, there is a need for improved thin sheet composite compositions in which the alignment of nanoparticles is substantially improved and for which the gas permeability transmission rates are reduced to values near those expected for well aligned particles.

PCT Publication No. WO 00/40404 to Chu et al describes a barrier composite compositions which comprises nanoscale particles with permeabilities that are several times lower than the permeabilities of the pristine polymer. In this case the nano particles are mixed with a liquid polymer and the fluid mixture is coated onto a substrate surface to obtain a barrier film. The amounts of nanoparticles used are relatively low so that the particles constitute 5 to 20 weight percent and which maintain the clarity often desired for certain applications. Higher loadings of nanoparticles compromise the fluidity of the suspension, making it difficult to apply the suspension to the surface to achieve a uniform coating. Thus, to achieve thicker coatings with better barriers, one must repeat the dip coating or spray coating process several times. U.S. Pat. No. 6,337,046 B1 is similar in content to the Chu et al application.

Various coatings are used on plastic surfaces as a barrier to limit transmission of oxygen and water. These coatings are generally for the purpose of maintaining the clarity of a clear substrate. Illustrative is U.S. Patent Publication No. 2002/0006518 A1 where clay is used as the coating. Particles of silica and metals have also been used as barrier coatings. Particle coatings are often discontinuous or irregular, lack abrasion resistance, and do not adhere well to the polymer surfaces to which they are applied.

OBJECTS

An object of the present invention is to provide for a low cost, environmentally benign, universal method for preparing a water-insoluble polymer fabric composite composition wherein the permeability of the composition to small molecules is substantially less than the permeability of the polymer and the fabric from which it is constructed.

A further object of the present invention is to provide for hybrid (nano) composite compositions of cured thermoset polymer matrix or thermoplastics and inorganic fabric, wherein the inorganic fabric comprises overlapping lamellar tactoids which consists of closely stacked nanolayers or interlocked lamellar tactoids together with exfoliated individual nanolayers surrounding the tactoids in the polymer matrix. In both the above cases the lamellar tactoids are surrounded by polymer layers, while the exfoliated phase surrounding the tactoids improves the interfacial properties of the (nano)composite and adhesion of the polymer to the surface of the fabric. The formation of the described composite compositions is achieved by impregnating the fabric with the polymer or the polymer precursors.

Another object of the present invention is to provide for hybrid (nano)composite compositions of cured water-insoluble thermoset polymer matrix of thermoplastics and inorganic or organic or mixed organic-inorganic fabric, wherein the fabric comprises interdigitated fibers, the fabric being impregnated with the polymer or the polymer precursors.

Another object of the present invention is to provide a method for preparing homoionic inorganic and heterostructured mixed organic-inorganic ion clay films wherein both the surfaces of the inorganic clay film have been chemically modified by partial ion-exchange of the inorganic cations with alkylammonium ions, while the center part of the heterostructured clay film consists mainly of lamellar tactoids with closely stacked nanolayers having only inorganic cations as exchange ions.

Another object of the present invention is to provide for a method of preparing proton-exchanged smectite clay in fine powder form by ion-exchanging sodium-smectite clay powder with mildly acidic ethanol or mixtures of water-ethanol solutions and to further use the fine powdered proton-exchanged smectite clay to prepare water-clay colloidal solutions which are used as precursors for the formation of homoionic proton-exchanged smectite clay film. The reduction of gas permeability of polymers and plastics to small molecules such as oxygen, hydrogen, water vapor, carbon dioxide, etc., is an important need for a vast number of applications, such as perishable food and beverage packaging, gas storage and transportation, moisture and air-proof packaging.

It is therefore an object of the present invention to provide relatively thin sheet composite compositions which have a very low oxygen transmission rate, as well as a low transmission rate toward other small molecules. Further it is an object of the present invention to provide such sheet composite compositions which are relatively straightforward to prepare and which are economical. These and other objects will become increasingly apparent by reference to the following description.

SUMMARY OF THE INVENTION

The present invention relates to a non-transparent composite sheet composition which comprises:

(a) a sheet of preformed self-supporting, porous fabric layer of interdigitated, separate elongate members, which form the fabric layer; and (b) a polymer which has been impregnated into the fabric sheet, wherein the composite composition has a transmission rate to oxygen in the direction orthogonal to the sheet that is less than one-tenth the transmission rate for the fabric sheet alone and less than one-fifth the transmission rate for the polymer alone without the fabric layer and wherein the elongate particles have a length or width that is at least ten times greater than the thickness of the particle.

Preferably the elongate particle members comprising the self-supporting fabric film are lamellar particles with width to thickness dimension ratios of at least 10. Also preferably the elongate particle members are comprised of fibrous particles with a length to width dimension ratio of at least 10. Preferably the composite sheet without the polymer is at least 25% by weight of the composition.

The present invention also relates to a method for providing a confined space with a low permeability to a gas or a vapor which comprises:

(a) forming the confined space with a composite composition which comprises: a preformed self-supporting, porous fabric sheet of interdigitated, separate elongate particles, the particles having a length or width that is at least ten times greater than the thickness of the particle; and a polymer which has been impregnated into the fabric layer, wherein the composite composition has a transmission rate to oxygen in the direction orthogonal to the sheet that is less than one-tenth the transmission rate for the fabric sheet alone and less than one-fifth the transmission rate for the polymer alone without the fabric layer; and (b) exposing the sheet to at least one gas or the vapor, wherein the composite sheet composition provides the barrier to the gas or vapor.

The present invention relates to a package for enclosing a material which comprises a composite composition, which is at least part of the package for the material which comprises: a composite sheet of a preformed self-supporting, porous fabric layer of interdigitated, separate elongate particle members, which form the fabric layer, and a polymer which has been impregnated into the fabric layer, wherein the composite composition has a transmission rate to oxygen in the direction orthogonal to the sheet that is less than one-tenth the transmission rate for the fabric sheet alone and less than one-fifth the transmission rate for the polymer alone without the fabric layer.

The present invention relates to a container for storing a gas which comprises a composite composition which is at least a part of the container for containing the gas, which comprises: a composite sheet of a preformed self-supporting, porous fabric layer of interdigitated, separate elongate particle members, which form the fabric layer and a polymer which has been impregnated into the fabric layer, wherein the composite composition has a uniform transmission rate to oxygen in the direction orthogonal to the sheet that is less than one-tenth the transmission rate for the fabric sheet alone and less than one-fifth the transmission rate for the polymer alone without the fabric layer.

The present invention relates to a process for producing a low permeability composite composition which comprises:

(a) providing a sheet which comprises: forming a preformed self-supporting, porous fabric layer of interdigitated, separate elongate particle members, which form the fabric layer, and (b) impregnating the fabric layer of the sheet with a polymer, wherein the sheet composite composition has a uniform transmission rate to oxygen in the direction orthogonal to the sheet that is less than one-tenth the transmission rate for the fabric sheet alone and less than one-fifth the transmission rate for the polymer alone without the fabric layer.

The "polymer-fabric film composites" of this invention are comprised of a self-supporting fabric layer impregnated in part or in total with an organic polymer by melt processing, impregnation through pressing, and in situ polymerization and wherein the permeability of the resulting composite composition to oxygen is preferably less than one-fifth the permeability of the pristine polymer alone. Preferably, the composition also provides a barrier to hydrogen.

The term "fabric film" is defined as a continuous, self-supporting thin film formed by the entanglement, overlapping and interdigitation of elementary elongate members with a lamellar, platy, fibrous, needle-like or whisker-like morphology, the planes of the lamellar or platy particles and the long axes of the fibrous or needle-like particles being substantially aligned with the plane of the film. The self-supporting film may be free standing or it may be applied and supported on a substrate to improve the barrier properties of the substrate. The elongate members are preferably flattened, as in FIGS. 8A to 10C, to enable couple filling of the elongate members with the polymer. The fibers have a thickness in the dimension of less than ten micrometers and preferably less than one micrometer.

The elementary elongate members are comprised of layered silicate clays, (e.g. a smectite clay, vermiculite, mica, or a silicic acid derivative such as magadite, kenyaite, and the like), a layered double hydroxide or hydrotalcite anionic clay, or fibrous to needle-like clay (e.g., attapulgite, sepiolite), and various fibrous particles, particularly cellulose fibers, as well as fibers of a synthetic polymer, fibers of carbon, and fibers of silica, alumina, other ceramic metal oxides, as well as ceramic metal nitrides, borides, and carbides. Particularly useful are fabrics derived from the micron to submicron particles of naturally occurring and synthetic smectite clays and the micron to submillimeter cellulose fibers comprising various types of paper including writing paper, tracing paper and filter paper (Kirk Othmer, Vol. 16, pages 768 to 825 (1981)), are incorporated by reference herein). Tracing papers, such as those described in an article published in J. Amer. Inst. Conservation, Vol. 32, number 2, Article 8, pp 177–206, are particularly useful fabrics for the purpose of providing the barrier compositions of this invention.

"Paper" or "paper fabric" is defined as a fabric film or fabric layer made primarily of cellulose fibers, most preferably flattened cellulose fibers. A "paper fabric" also is defined as a composite film comprising cellulose fibers as the primary component and lesser amounts of additives such as organic sizing agents and clay particle fillers.

EXAMPLES 1–3

Example 1–3 demonstrate the preparation of self-supported fabric films comprised of homoionic inorganic ion-exchanged smectite clay particles (montmorillonite) with platelet particle morphology by first spreading a suspension of the clay onto a flat substrate, allowing the solvent to evaporate and subsequently removing the resulting fabric film from the substrate. Example 1 makes use of glass as the substrate upon which the fabric fill is cast; Examples 2 and 3, respectively, make use of epoxy and high density polyethylene substrates for casting the fabric films.

Figure 1:
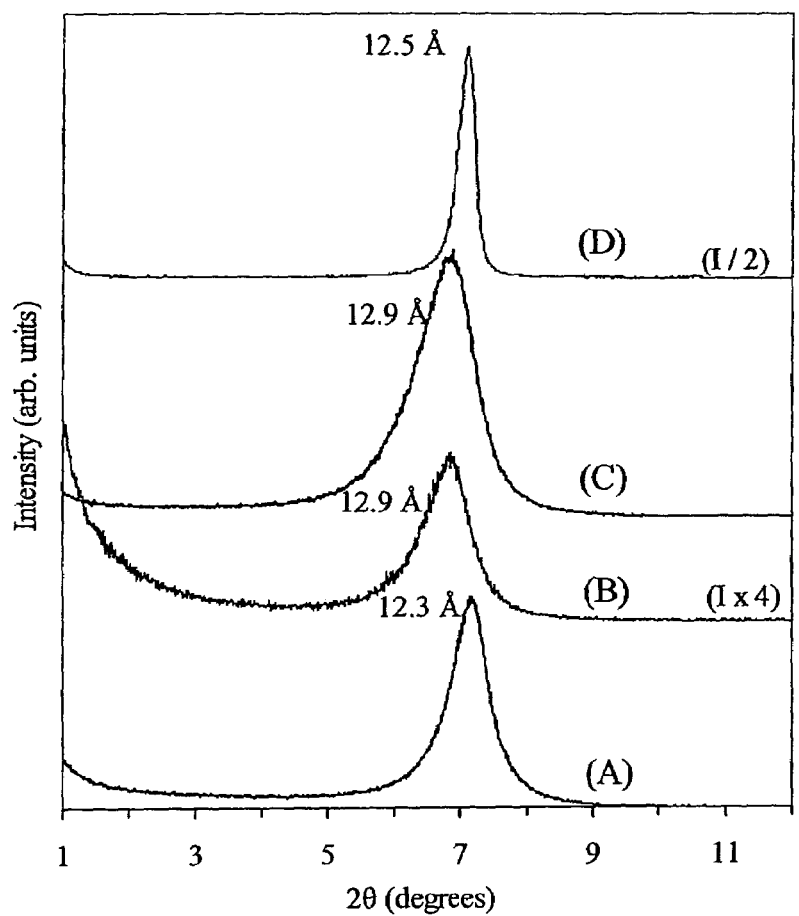
FIG. 1 shows the X-ray diffraction (XRD) patterns of (A) homoionic inorganic sodium-montmorillonite clay film E1 (CEC=120 meq./100 g), (B) homoionic inorganic proton-exchanged montmorillonite clay powder E4 (CEC=120 meq./100 g), (C) homoionic inorganic proton-exchanged montmorillonite clay film E5 (CEC=120 meq./100 g), (D) homoionic inorganic lithium-fluorohectorite clay film E6 (CEC=120 meq./100 g).

A 200-mL of aqueous suspension containing 10.0 g of sodium-montmorillonite (PGW from Nanocor, Inc., cation exchange capacity (CEC)=120 meq./100 g, particle size smaller than 270 mesh) was blended at room temperature for 1–2 min. The aqueous clay suspension with a clay concentration of 5 weight percent was stored in high-density polyethylene bottles for 1 day. The suspension was then spread onto a glass plate and allowed to dry at room temperature and atmospheric conditions for a period of 3 days. The clay fabric film thus formed was peeled off the glass plate by gradually wetting the film with ethanol starting from the edges. In this way a smooth, self-supported, continuous, semi-transparent $Na^+$-montmorillonite clay fabric film was produced (E1). The thickness of the fabric film was uniform at 60 μm. The thickness of the film could be easily varied by adjusting the initial concentration of the aqueous clay colloidal suspension. For example, a 3 w/v % clay suspension resulted in a 35 μm thick film. The X-ray diffraction (XRD) pattern of sample E1 is shown in FIG. 1A. Fabric film E1 exhibited a basal spacing of 12.3 Å.

In Example 2 (E2) an epoxy substrate is used to cast a sodium montmorillonite fabric film. A 1.7-mL volume of a 2% w/v clay-water colloidal suspension was allowed to evaporate onto a 17 $cm^2$ cured epoxy disk at room temperature. The formed clay fabric film had a thickness of ~10 μm.

The inorganic clay fabric film of Example 3 was prepared following the procedure of Example 2, except that the polymer substrate was a high density polyethylene (HDPE) film. The formed clay film (E3) had a thickness of ~20 μm.

EXAMPLES 4, 5

Example 4 demonstrates a new method for preparing a proton-exchanged smectite clay in fine powder form, and Example 5 demonstrates the use of this clay for the preparation of a self-supported fabric film made of a homoionic proton-exchanged smectite clay.

A 1 L of ethanol suspension containing 40.0 g of sodium-montmorillonite (PGW from Nanocor, Inc., cation exchange capacity (CEC)=120 meq./100 g, aggregated particle size smaller than 270 mesh) was blended at room temperature for 1–2 min. A 85-mL portion of 2 N aqueous HCl solution was mixed with 415 mL of ethanol and the resulting solution was added under stirring to the ethanol-clay suspension. The volume of the final ethanol-HCl-clay suspension was 2 L after adding another 0.5 L of ethanol and the pH value of the suspension was 2.5–3, as judged by the use of pH indicator paper. The suspension was stirred for 2 days at room temperature and it was then centrifuged to separate the liquid from the wet clay. The wet clay was re-suspended in 800 mL ethanol, stirred for 30 min and then separated again by centrifugation. The washed clay slurry was re-suspended in 1 L ethanol and an ethanol-HCl solution similar to the one above described was added to the ethanol-clay suspension under stirring to repeat the ion exchange reaction. The volume of the final ethanol-HCl-clay suspension was 2 L after adding another 0.5 L of ethanol and the pH value of the suspension was 2.5–3. The suspension was stirred for 2 days at room temperature and it was then centrifuged to separate the liquid from the clay. The wet clay slurry was then re-suspended in 800 mL ethanol, stirred for 30 min and centrifuged again. The washing step was repeated another 2 times. The supernatant solution after the third washing step was free of chloride. After the third washing, the resulting clay slurry was spread onto a glass plate and left to dry at room temperature under atmospheric conditions. The air-dried proton-exchanged clay was scraped from the glass substrate with a razor blade and then converted into a fine powered form with an aggregated particle size smaller than 270 mesh (53 μm) by milling the clay a commercial blender. The powder X-ray diffraction (XRD) pattern of the powdered $H^+$-montmorillonite (E4) is shown in FIG. 1B. E4 exhibited a basal spacing of 12.9 Å. Approximately 95% of the sodium cations in the initial clay were replaced by protons in E4, as determined by sodium ion analysis.

Fine powder forms of the proton-exchanged montmorillonite could be obtained by following the same procedure as in E4, except that water or mixtures of water and ethanol were used for the preparation of each clay suspension (i.e., each ion-exchange and washing processes), except for the final washing step where pure ethanol was always used. Larger relative amounts of ethanol in the above ethanol/water mixtures resulted in larger portions of recovered fine powder of the proton-exchanged clay.

Smooth, self-supported, continuous, semi-transparent montmorillonite clay fabric films in proton cation exchange form (example E5) were prepared by using experimental conditions analogous to E1 except that the clay used was the proton-exchanged form of the sodium-montmorillonite clay (PGW), prepared as described in E4. The formed clay fabric film had a thickness of 35 μm. The thickness of the film could be varied depending on the initial concentration of aqueous clay colloidal suspension, as in example E1. Alternatively, the preparation of the proton-montmorillonite clay film can be achieved by using the water-exchanged and water-washed proton-exchanged montmorillonite slurry (before the drying step in produce E4), blending it with water and further diluting it with water to the desired clay percentage (ca., 3%). The X-ray diffraction (XRD) pattern of E5 is shown in FIG. 1C. Product E5 exhibited a basal spacing of 12.9 Å.

EXAMPLE 6

Example 6 demonstrates the preparation of a self-supported fabric film made of homoionic lithium-exchanged smectite clay particles with platelet morphology. In this example the smectite clay was a synthetic clay.

A 100-mL aqueous suspension containing 5 wt % lithium-fluorohectorite (Corning, Inc., cation exchange capacity (CEC)=120 meq./100 g) was spread on a glass plate and dried at room temperature and atmospheric conditions for a period of 3 days. The clay fabric film (example E6) was peeled off the glass plate by gradually wetting the film with ethanol starting from the edges. In this way a uniform, free-standing, continuous $Li^+$-fluorohectorite clay film was produced (E6). The thickness of the film was 65 μm, but it could varied depending on the initial concentration of the aqueous clay suspension used, as in example E1. The X-ray diffraction (XRD) pattern of E6 is shown in FIG. 1D. E6 exhibited a basal spacing of 12.5 Å.

EXAMPLE 7

Example 7 demonstrates the preparation of a heterostructured mixed organic-inorganic cation exchanged smectite clay fabric film by partial surface-selective ion-exchange of the sodium cations of a sodium-montmorillonite fabric film with organic cations as a surface modifier, namely, alkylammonium ions of a diprotonated diamine.

A self-supported, homoionic inorganic sodium-montmorillonite fabric film (E1) with dimensions approximately 8 cm×8 cm was submerged at room temperature in a diprotonated diamine ethanol solution. The diamine solution was previously formed by mixing 3.6 g of the polyoxypropylene diamine D-2000 (Jeffamine D-2000, Huntsman Co.) with 12.5 mL aqueous HCl solution 0.295 N and was further diluted with 50 mL ethanol. The time of submersion was 5 min (E7a), 30 min (E7b), 2 hrs (E7c) and 6 hrs (E7d). The resulting clay fabric films were dried in air at room temperature for 5 days and were then washed with ethanol by rinsing each one of them in 50 mL of pure ethanol for 1 or 2 min. The washed clay fabric films were dried in air at room temperature for 5 days.

Figure 2:
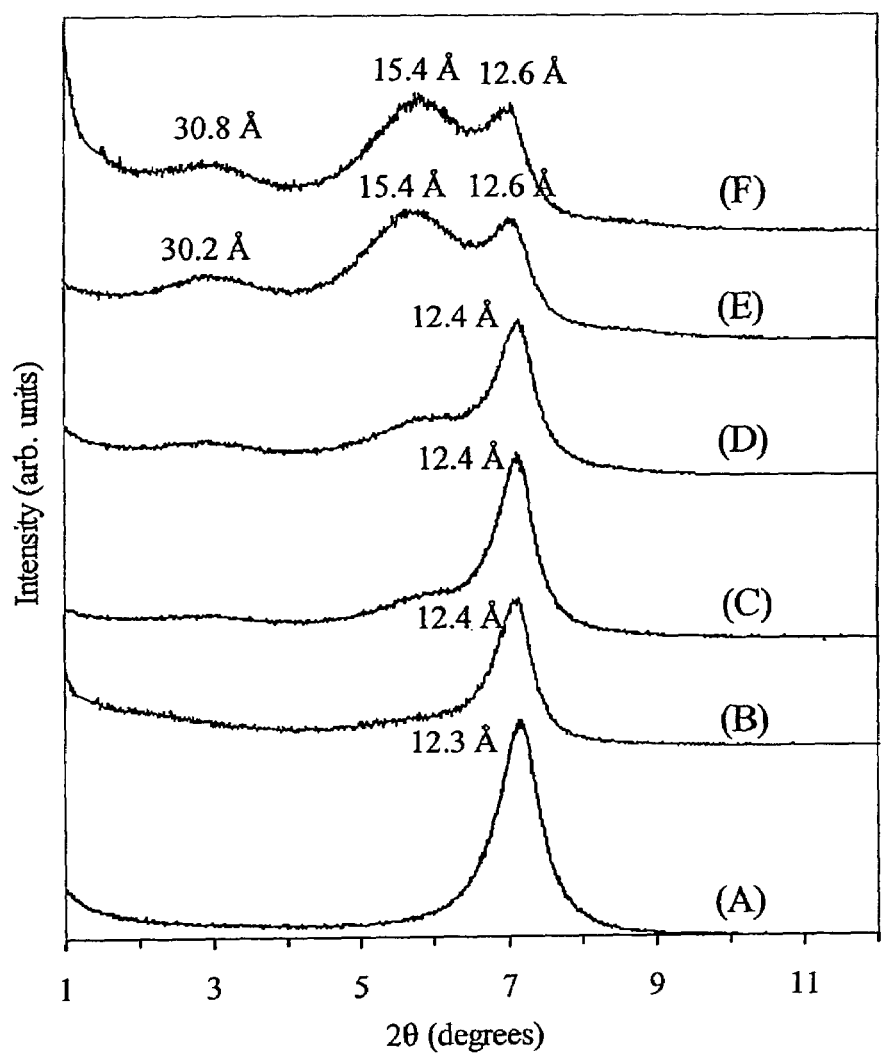
FIG. 2 shows the X-ray diffraction (XRD) patterns of (A) homoionic inorganic sodium-montmorillonite clay film E1 (CEC=120 meq./100 g), and of the heterostructured mixed sodium-onion ion exchanged montmorillonite clay films (B) E7a, 5 min ion-exchanged with diprotonated diamine D-2000 and 2 min washed with ethanol, (C) E7b, 30 min ion-exchanged with diprotonated diamine D-2000 and 2 min washed with ethanol, (D) E7c, 2 hrs ion-exchanged with diprotonated diamine D-2000 and 2 min washed with ethanol, (E) E7d, 6 hrs ion-exchanged with diprotonated diamine D-2000 and 1 min washed with ethanol, (F) E7d, 6 hrs ion-exchanged with diprotonated diamine D-2000 without washing with ethanol. The progressive development of the mixed-ion phase on the surfaces of the clay film with increasing ion-exchange time and the relative decrease of the intensity of the reflection due to the center inorganic clay phase can be seen from the patterns in this figure. The mixed-ion phase after 6 hrs ion-exchange with the diprotonated diamine D2000 had a basal spacing of ~30 Å.

The XRD patterns of the unwashed diamine-exchanged montmorillonite clay film E7d and of the washed films E7a (2 min washing), E7b (2 min washing), E7c (2 min washing) and E7d (1 min washing) are shown in FIG. 2. The XRD pattern of the inorganic sodium-montmorillonite clay film E1 is also included for comparison. From the data in FIG. 2 it is clear that exposing the inorganic clay fabric film in the diprotonated diamine solution resulted in a depth-selective ion-exchange of sodium ions by the bulky organic onium ions. The mixed organic-inorganic cation phase of the near-surface region of the fabric film is more clear at relatively long ion-exchange times, e.g., at 6 hrs, giving a basal spacing of approximately 30 Å. The respective XRD peak is broad and relatively weak while a weaker second order peak with basal spacing of approximately 15 Å can also be clearly identified. The diffraction peak that corresponds to the center inorganic phase near the center of the clay fabric film, which has not been ion-exchanged with onium ions, is at the same 2é position as the un-exchanged clay with a basal spacing of approximately 12.5 Å. The intensity of this diffraction peak decreases as the ion-exchange time increased.

Figure 3:
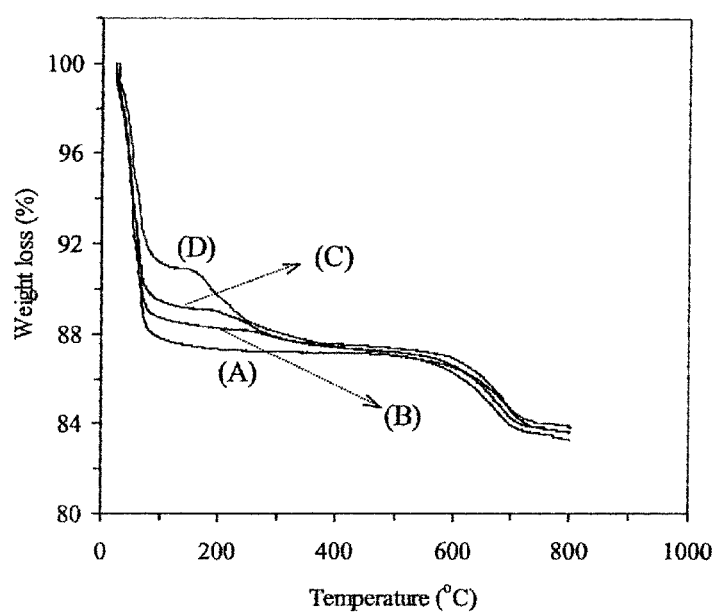
FIG. 3 shows the Thermogravimetric (TGA) analysis curves of (A) homoionic inorganic sodium-montmorillonite clay film E1 (CEC=120 meq./100 g), and of the heterostructured mixed sodium-onion ion exchanged montmorillonite clay films, (B) E7b, 30 min ion-exchanged with diprotonated diamine D-2000 and 2 min washed with ethanol, (C) E7c, 2 hrs ion-exchanged with diprotonated diamine D-2000 and 2 min washed with ethanol, (D) E7d, 6 hrs ion-exchanged with diprotonated diamine D-2000 and 1 min washed with ethanol (The TGA experiments were performed under nitrogen flow and the clay films were ground into powder forms before testing). The higher loading of the mixed-ion clay films with the diamine modifier at longer ion-exchange times can be clearly realized from this figure.

The thermogravimetric analysis (TGA) curves of the washed E7b, E7c and E7d clay films are shown in FIG. 3. The TGA curve of the inorganic sodium-montmorillonite clay film E1 is also included for comparison. The percent ion-exchange of sodium cations by onium ions of the diprotonated diamine was determined for the ion-exchanged clay films by elemental analysis (CHN) and by TGA. The two methods give comparable results. The results from elemental CHN analysis are given in Table 1.

The percent ion-exchange of sodium cations by onium ions of the diprotonated diamine for the four clay fabric films was also determined by Scanning Electron Microscopy-Energy Dispersive Spectroscopy (SEM-EDS) microanalysis. These results are also given in Table 1. From the CHN data in Table 1 it can be seen that the rate of ion-exchange is relatively low. After 6 hrs only 3.5% of the total sodium ions have been exchanged by onium ions. In addition, at this low exchange levels, short-time washing with ethanol does not extract significant amounts of diprotonated diamine from the exchanged fabric films (Table 1 and FIG. 2). However, the degree of ion-exchange determined from the EDS microanalysis are different and significantly higher than those obtained by TGA and CHN analysis. The SEM-EDS method of analysis is a near-surface characterization technique, while CHN and TGA are bulk techniques. Thus, the much higher ion-exchange values obtained by the SEM-EDS method verifies that the immersion method of ion-exchanging the fabric films is depth-selective and favors the replacement of the ions in the near-surface region of the fabric film at comparatively short reaction times.

EXAMPLE 8

Example 8 demonstrates the preparation of a heterostructured mixed organic-inorganic cation exchanged smectite clay fabric film by a depth-selective ion-exchange of the lithium cations of a lithium-fluorohectorite fabric film with an organic surface modifier, namely, the alkylammonium ions of a diprotonated diamine.

Figure 4:
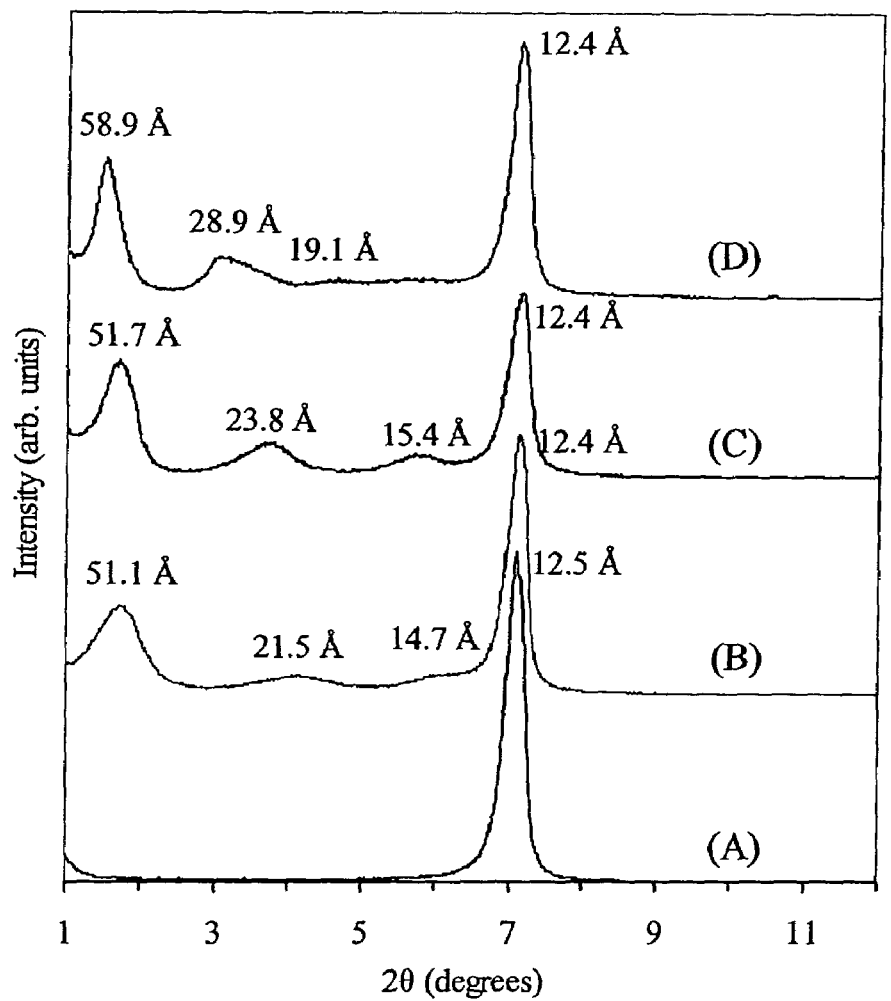
FIG. 4 shows the X-ray diffraction (XRD) patterns of (A) homoionic inorganic lithium-fluorohectorite clay film E6 (CEC=120 meq./100 g), and of the heterostructured mixed lithium-onium ion exchanged fluorohectorite clay films (B) E8a, 5 min ion-exchanged with diprotonated diamine D-2000 and 2 min washed with ethanol, (C) E8b, 30 min ion-exchanged with diprotonated diamine D-2000 and 1 min washed with ethanol, (D) E8b, 30 min ion-exchanged with diprotonated diamine D-2000 without washing with ethanol. The ion-exchange of the inorganic cations of the fluorohectorite clay film with the onium ions of the diprotonated diamine D2000 is much faster than in the montmorillonite clay film, and after only 5 min of ion-exchange a mixed organic-inorganic ion phase has been developed on the surfaces of the clay film with basal spacing of ~50 Å. The basal spacing of the center inorganic phase of the clay film was always ~12.5 Å.

A portion of the homoionic inorganic lithium-montmorillonite fabric film (E6) with dimensions approximately 8 cm×8 cm was immersed at room temperature in a diprotonated diamine ethanol solution. The diamine solution was prepared by mixing 3.6 g of the polyoxypropylene diamine D-2000 (Jeffamine D-2000, Huntsman Co.) with 12.5 mL aqueous HCl solution 0.295 N and was further diluted with 50 mL ethanol. The time of immersion was varied from 5 min (E8a) to 30 min (E8b). The clay fabric films were dried in air at room temperature for 5 days and were then washed with ethanol by immersing each one of them in 50 mL of pure ethanol for 2 and 1 min, respectively. The washed clay films were dried in air at room temperature for 5 days. The XRD patterns of the unwashed diamine-exchanged montmorillonite clay film E8b and of the washed films E8a and E8b are shown in FIG. 4. The XRD pattern of the inorganic lithium-fluorohectorite clay film E6 is also included for comparison. The formation of heterostructured mixed organic-inorganic cations clay films is clearly shown in the XRD patterns of FIG. 4 where the high aspect ratio, synthetic fluorohectorite clay exhibits up to three orders of reflections for the mixed-ion near-surface phase and a sharp peak for the center inorganic part of the film. Even after 5 min of ion-exchange the basal spacing for the mixed-ion near-surface phase was approximately 51 Å while the basal spacing of the inorganic phase was constant at approximately 12.5 Å.

Figure 5:
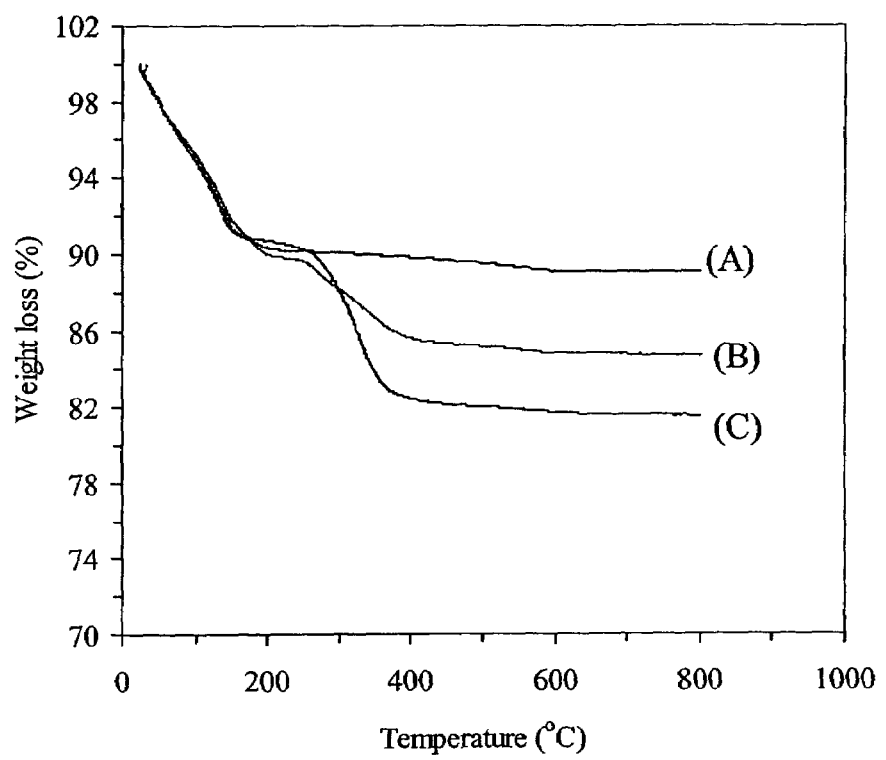
FIG. 5 shows the Thermogravimetric (TGA) analysis curves of (A) homoionic inorganic lithium-fluorohectorite clay film E6 (CEC=120 meq./100 g), and of the heterostructured mixed lithium-onium ion exchanged fluorohectorite clay films (B) E8a, 5 min ion-exchanged with diprotonated diamine D-2000 and 2 min washed with ethanol, (C) E8b, 30 min ion-exchanged with diprotonated diamine D-2000 and 1 min washed with ethanol (The TGA experiments were performed under nitrogen flow and the clay films were ground into powder forms before testing).

The thermogravimetric analysis (TGA) curves for the washed E8a and E8b clay films are shown in FIG. 5. The TGA curve of the inorganic lithium-fluorohectorite clay film E6 is also included for comparison. The percent ion-exchange of lithium cations by onium ions of the diprotonated diamine was determined for the ion-exchanged clay films by elemental analysis (CHN) and by TGA. Both methods give similar data. The results from elemental CHN analysis are given in Table 1. In contrast to the mixed-ion montmorillonite clay film (Example 7), the rate of ion-exchange of lithium ions by onium ions in the lithium-fluorohectorite clay fabric film is very high. After 30 min of immersion, the degree of ion-exchange of the lithium ions by onium ions is 8%. Fast washing with ethanol decreases the relatively high amount of diprotonated diamine in the heterostructured mixed-ion fluorohectorite clay fabric film significantly, as it can be seen both from the decrease of the basal spacing in the XRD patterns and the elemental analysis data.

EXAMPLES 9–13

Examples 9–13 demonstrate the preparation of barrier composite sheets comprised of a polymer-impregnated self-supporting, clay fabric films with extremely high barrier properties. The barrier composition was made by impregnating homoionic inorganic smectite clay fabric films with a polymer precursors and subsequently curing the polymer. The polymer used in these examples was a cross-linked thermoset epoxy matrix.

Figure 6:
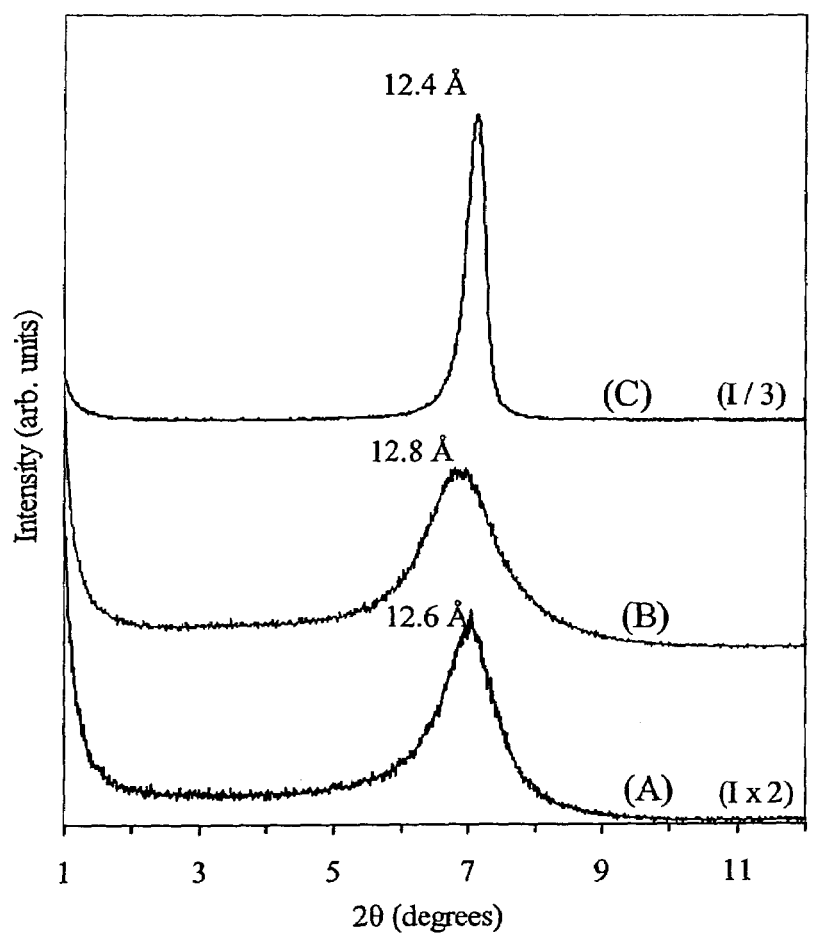
FIG. 6 shows the X-ray diffraction (XRD) patterns of composite epoxy-clay films (Examples 9–12) prepared by impregnation of the homoionic inorganic smectite clay films of Examples 1–6 with epoxy prepolymer and diamine curing agent [EPON 826 plus diamine D-230], followed by complete curing of the epoxy composite specimen: (A) composite epoxy-clay film E9, using the homoionic inorganic sodium-montmorillonite clay film E1, (B) composite epoxy-clay film E11, using the homoionic inorganic proton-exchanged montmorillonite clay film E5, (C) composite epoxy-clay film E12, using the homoionic inorganic lithium-fluorohectorite clay film E6. The XRD patterns of the composite samples were similar to the patterns of the inorganic clay films that were used to fabricate the composites.

A portion of the self-supporting homoionic inorganic sodium-montmorillonite film (E1) with dimensions approximately 8 cm×8 cm was dipped in a mixture of epoxy resin EPON 826 (epoxy equivalent weight ~182, Shell) and diamine D-230 (Jeffamine D-230, Huntsman, Co.) at room temperature until it was well-wetted on both sides. The epoxy-diamine mixture was prepared by mixing 30.92 g of the liquid EPON 826 resin with 9.76 g of the diamine Jeffamine D-230 at 50° C., for 30 min, under stirring. Before immersing the clay film, the uncured epoxy-diamine mixture was outgassed at room temperature for 30 min. The clay fabric film, impregnated with the uncured, liquid epoxy-diamine mixture was then suspended vertically at room temperature in air so that the excess epoxy-diamine mixture was allowed to drip off of the fabric film. After 1 day in air the epoxy resin was partially cured. The composite epoxy-clay film was then heated in an oven at 60° C. for 3 hrs and 125° C. for 3 hrs in nitrogen atmosphere so that the epoxy resin was completely cured. The cured composite epoxy-clay fabric film (E9) was smooth, flexible, and semi-transparent. The total thickness of the composite epoxy-clay fabric composite film was 0.11 mm. The XRD pattern of E9 is shown in FIG. 6 and is similar to the XRD pattern of the sodium-montmorillonite clay film E1 (FIG. 1) used to prepare the composite polymer-clay film. The oxygen permeability of E9 was measured with a commercial instrument (OX-TRAN 2/60, MOCON). The mean value of three replicate measurements with different samples was <0.1 cc.mil/$m^2$.day.atm. The corresponding oxygen permeability value for a pristine epoxy polymer film was 98.9 cc.mil/$m^2$.day.atm, while for the pristine clay film E1 the permeability was approximately $6 \times 10^3$ cc.mil/$m^2$.day.atm. The epoxy-clay composite film E9 showed more than 3 orders of magnitude reduced permeability, approaching the detection limits of the oxygen permeability instrument) compared to the pristine, unmodified epoxy polymer film. The oxygen permeability results are listed in Table 2.

A second composite epoxy-clay film (E10) was prepared by using the same method as for E9 except that the impregnated homoionic inorganic sodium-montmorillonite film used for the preparation of E10 was thinner (e.g. 35 µm) compared to the one used for E9 (e.g. 60 µm). The total thickness of the composite epoxy-clay fabric film E10 was 0.10 mm. The XRD pattern (not shown) of E10 was similar to that of E9. Optical images of the epoxy-clay film composite sample E10 are shown in FIG. 14. The oxygen permeability of E10 was 0.97 cc.mil/$m^2$.day.atm. The epoxy-clay composite film E10 showed 2 orders of magnitude reduced permeability compared to the pristine, unmodified epoxy polymer film. The oxygen permeability results are listed in Table 2.

A third composite epoxy-clay film (E11) was prepared using the same method as for E9, except that the clay film used was the homoionic inorganic proton-montmorillonite film E5 (thickness 35 µm). The total thickness of the E11 composite epoxy-clay film was 0.07 mm. The XRD pattern of E11 is shown in FIG. 6. The pattern is similar to that for the initial proton-montmorillonite clay film E5 (FIG. 1) used to prepare the composite polymer-clay fabric film composite sheet. The oxygen permeability of the E11 composite was 11.3 cc.mil/$m^2$.day.atm approximately 10 times lower than the permeability of the pristine epoxy polymer film. The oxygen permeability results are listed in Table 2. The thickness of the epoxy-clay fabric film composite E11 was smaller than that of the composite film E10 (0.07 mm versus 0.10 mm) which was prepared from the sodium-montmorillonite clay film, although in both composite specimens the clay films had similar thickness (e.g., 35 µm). A second immersion of the partially cured E11 composite specimen (1 day in air) in the liquid epoxy-diamine mixture followed by complete curing of the epoxy resulted in the formation of a 0.15-mm thick specimen (Example E11a) which showed similar reduction of oxygen permeability compared to E11. The oxygen permeability of E11a was 10.5 cc.mil/$m^2$.day.atm. The observed difference in the barrier properties between the epoxy composites formed from sodium-montmorillonite and proton-montmorillonite clay films may be attributed to the higher oxygen solubility in the presence of the surface hydroxyls in the latter clay film compared to former, provided that the rest of the compositional, structural and textural properties of the two clay films are similar.

A fourth composite epoxy-clay film (E12) was prepared by using the same method as for E9 except that the clay film used for impregnation was the homoionic inorganic lithium-fluorohectorite film E6 (thickness 65 µm). The total thickness of the composite epoxy-clay film E12 was 0.15 mm. The XRD pattern of E12, which is similar to that of lithium-fluorohectorite clay fabric film E6 (FIG. 1), is shown in FIG. 6. The oxygen permeability of E12 was 1.16 cc.mil/$m^2$.day.atm, while the oxygen permeability of the pristine clay film E6 was approximately $1 \times 10^4$ cc.mil/$m^2$.day.atm. The permeability of the composite epoxy-clay film E12 was 2 orders of magnitude reduced compared to the pristine, unmodified epoxy polymer. The oxygen permeability results are listed in Table 2. In the case of E12, which was prepared using a lithium-fluorohectorite clay fabric, the coverage of the film surface by cured epoxy polymer was not homogeneous and the epoxy film formed was irregular. However, E12 showed an equally substantial reduction in oxygen permeability compared to montmorillonite-based, epoxy-clay composite that were uniformly coated by epoxy. A second immersion of the partially cured E12 into the epoxy-diamine mixture resulted in a uniformly encapsulated epoxy-clay fabric composite film. The oxygen permeability of this latter film composite (Example E12a) was <0.1 cc.mil/$m^2$.day.atm., more than 3 orders of magnitude lower than the permeability of the pristine epoxy polymer.

A fifth composite epoxy-clay film (E13) was prepared by applying a layer of epoxy resin on the surface of the epoxy-supported clay film of Example 2. The top epoxy film was applied either by spin-coating the uncured, liquid mixture of the epoxy precursors and the diamine curing agent onto the epoxy-supported clay film or by immersing the epoxy-supported clay film in the above uncured, liquid resin, followed by curing of the final epoxy-clay composite composition as in Example 9. The total thickness of the composite epoxy-clay film E13 was 0.25 mm. The XRD pattern (not shown) of E13 was similar to that of E9. The oxygen permeability of E13 was <0.1 cc.mil/$m^2$.day.atm. The permeability of composite epoxy-clay film E13 was more than 3 orders of magnitude lower than the permeability of the pristine, unmodified epoxy polymer film, although the clay fabric film represented only 5 wt. % (or 4 vol. %) of the composite specimen E13, compared to the higher loadings of Examples 9–12. The oxygen permeability results are listed in Table 2.

EXAMPLES 14, 15

Examples 14 and 15 demonstrate a new method for the preparation of a polymer-clay fabric film sheet with extremely high barrier properties by impregnating a heterostructured mixed organic-inorganic cation smectite clay fabric film with a polymer precursor and then curing the polymer precursor. The polymer used in these examples was a cross-linked thermoset epoxy.

Figure 7:
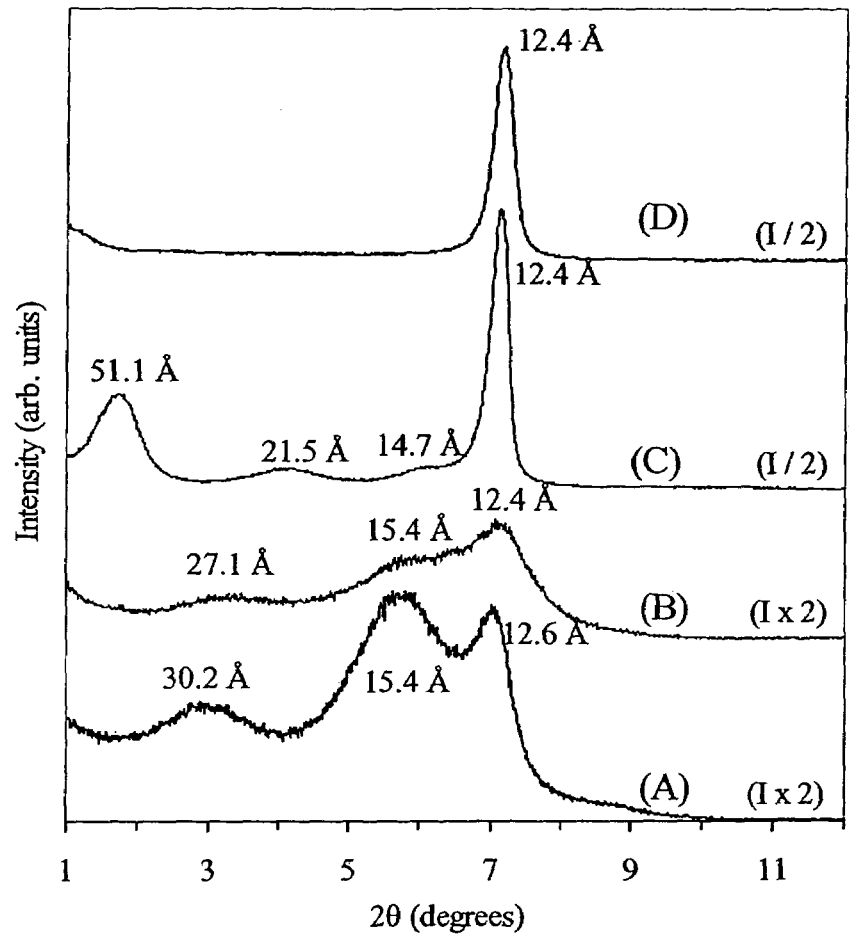
FIG. 7 shows the X-ray diffraction (XRD) patterns of composite epoxy-clay films (Examples 14, 15) prepared by impregnation of the heterostructured mixed organic-inorganic cation smectite clay films of Examples 7 and 8 with the uncured, liquid epoxy-curing agent mixture [EPON 826 plus diamine D-230], followed by complete curing of the epoxy composite specimen (the XRD patterns of the heterostructured clay films used are included for comparison): (A) heterostructured mixed sodium-onion ions montmorillonite clay film E7d, (B) composite epoxy-clay film E14, using the clay film E7d, (C) heterostructured mixed lithium-onium ions fluorohectorite clay film E8a, (D) composite epoxy-clay film E15, using the clay film E8a. The reflections due to the mixed-ion phase of the heterostructured clay films were no longer present in the patterns of the composites (more clearly in the heterostructured fluorohectorite clay film), while the peak, due to the center inorganic phase of the clay films was almost intact.
Figure 8A:
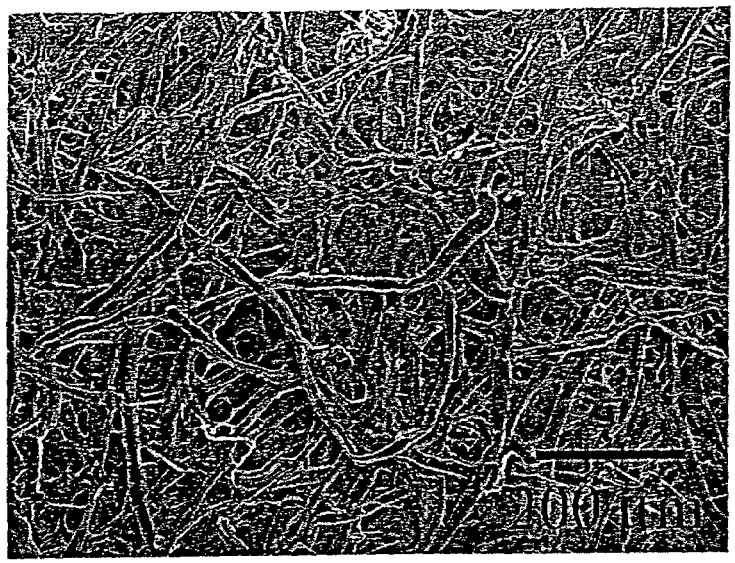
FIG. 8 provides scanning electron microscopic images of a filter paper at different magnifications: (A) and (B) provide surface views and (C) edge and basal surface views. The two manually drawn lines in part (C) define the edge of the film and the gray-black area on the left is the carbon adhesive tape used to support the filter paper on an aluminum stamp.
Figure 8B:
Figure 8C:
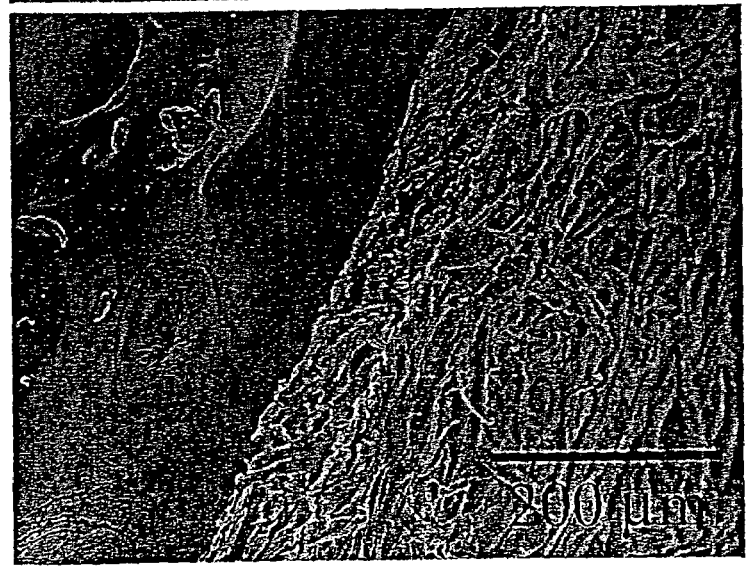
Figure 9A:
FIG. 9, parts (A), (B) and (C) are scanning electron microscopic images of tracing paper at different magnifications. The manually drawn lines and background is as described in FIG. 8.
Figure 9B:
Figure 9C:
Figure 10A:
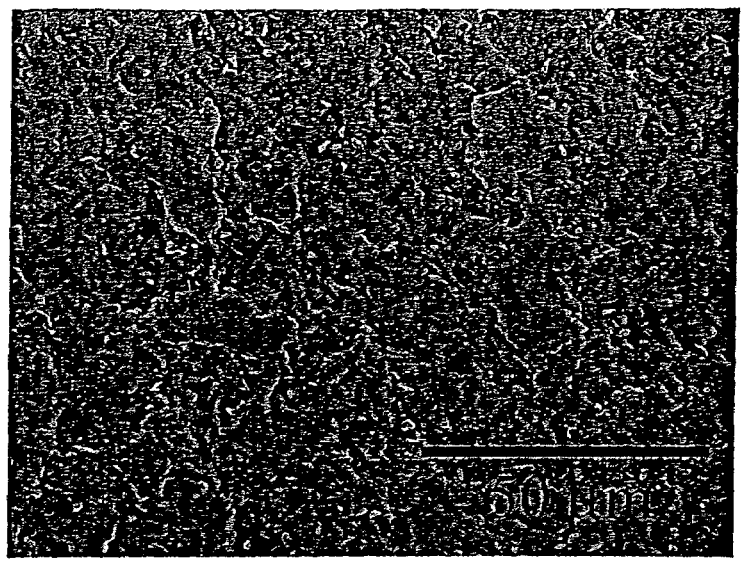
FIG. 10, parts (A), (B) and (C) are scanning electron microscopic images of a rhodium montmorillonite fabric film at trace different magnifications. The manually drawn lines and background are as described in FIG. 8.
Figure 10B:
Figure 10C:
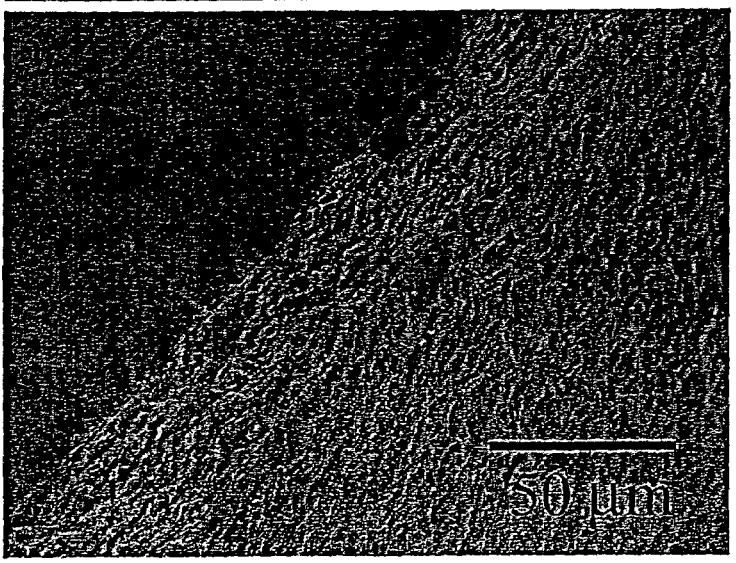

The method of preparation of the composite epoxy-clay films was similar to the method used in Examples 9–12. The sample according to Example 14 (E14) was prepared by impregnating the heterostructured mixed sodium-alkylammonium ion montmorillonite clay film E7d with the uncured, liquid epoxy-curing agent mixture, followed by curing of the epoxy-clay composite as described in Example 9. The cured composite epoxy-clay film E14 was smooth, flexible and semi-transparent, and uniformly covered on both sides with cured epoxy polymer (similar to E9). The total thickness of the composite epoxy-clay film E14 was 0.12 mm. The XRD pattern of E14 is shown in FIG. 7. The XRD pattern of the heterostructured mixed sodium-onium ion montmorillonite clay film E7d is also included for comparison. From the data in FIG. 7 it can be seen that the peaks corresponding to the surface mixed-ion phase of the clay film are significantly weakened and broadened, while the peak due to the central, non impregnated inorganic clay phase can still be clearly identified. The above result indicates that the near-surface regions of the heterostructured mixed-ion clay fabric film have been solvated by the epoxy resin, improving the interfacial adhesion and barrier properties. The oxygen permeability of E14 was 0.28 cc.mil/ $m^2$.day.atm. The composite epoxy-clay film E14 showed approximately 3 orders of magnitude reduced permeability compared to the pristine, unmodified epoxy polymer film. The oxygen permeability results are listed in Table 2.

Another epoxy-clay fabric film composite (Example 14a) was prepared from a heterostructured mixed-ion montmorillonite clay film similar to E14 but thinner (thickness 35 μm, instead of 60 μm). The oxygen permeability (0.1 cc.mil/ $m^2$.day.atm) corresponded to reduction of more than 3 orders of magnitude in comparison to the permeability of the pristine epoxy polymer film.

Example 15 (E15) was prepared by impregnating the heterostructured mixed lithium-alkylammonium ion fluorohectorite clay fabric film E8a with an uncured, liquid epoxy-curing agent mixture, followed by curing of the epoxy-clay fabric composite as described in Example 9. The cured composite epoxy-clay film E15 was flexible, smooth and had a thickness of 0.14 mm. The XRD pattern of E15 is shown in FIG. 7. The XRD pattern of the heterostructured mixed lithium-onium ions fluorohectorite clay film E8a is also included for comparison. From the data in FIG. 7 it can be seen that the relatively organophillic mixed-ion galleries of the surface of the clay film were completely solvated by the epoxy resin (absence of the basal reflections due to the mixed-ion surface phase), even more pronounced than in the case of the heterostructured mixed-ion montmorillonite clay film in Example E14. Although the diamine loading of the clay films in Examples E7d (clay film used for Example E14) and E8a (clay film used for Example E15) are similar, the basal spacing of the latter is significantly higher than that of the former accompanied by a higher lamellar ordering. This could be the reason for the greater swelling behavior of the heterostructured mixed-ion fluorohectorite clay film, compared to comparable montmorillonite films. The better wetting properties of the heterostructured mixed-ion fluorohectorite clay film have been already recognized. The higher aspect ratio and the more uniform charge distribution on the nanolayers of the synthetic fluorohectorite compared to the natural montmorillonite clay may account for the above differences between the two heterostructured clay films. The oxygen permeability of E15 was <0.1 cc.mil/ $m^2$.day.atm. The epoxy-clay composite film E15 showed more than 3 orders of magnitude reduced permeability (reaching the detection limits of the oxygen permeability instrument) compared to the pristine, unmodified epoxy polymer film. The oxygen permeability results are listed in Table 2. The mixed-ion fluorohectorite clay film was not uniformly covered by cured epoxy films, a behavior similar to the case of Example E12 where an inorganic fluorohectorite clay was used as a fabric. A second immersion of the partially cured E15 composite film in liquid, uncured epoxy-diamine mixture, followed by curing, resulted in a uniform epoxy-clay fabric film with barrier properties similar to those of E15.

EXAMPLES 16–18

Examples 16–18 demonstrate the preparation of composite polymer-paper fabric film composites with extremely high barrier properties. The barrier films are made by impregnating different types of commercial papers with the polymer or the polymer precursors. The polymer used in these examples was a cross-linked thermoset epoxy matrix.

A portion of a Filter Paper (from Ahlstrom Filter Papers, Grade 601) with dimensions approximately 8 cm×8 cm was immersed in a stoichiometric mixture of epoxy resin EPON 826 (epoxy equivalent weight ~182, Shell) and diamine D-230 (Jeffamine D-230, Huntsman, Co.) at room temperature until it was well-wetted on both sides. The epoxy-diamine mixture was prepared by mixing 30.92 g of the liquid EPON 826 resin with 9.76 g of the diamine D-230 at 50° C., for 30 min, under stirring. Before immersing the filter paper, the uncured epoxy-diamine mixture was outgassed at room temperature for 30 min. The immersed filter paper, impregnated with the uncured, liquid epoxy-diamine mixture was then hung vertically at room temperature in air so that the excess epoxy-diamine mixture was allowed to drip off. After 1 day in air the epoxy resin was partially cured. The composite epoxy-clay film was then heated in the oven at 60° C. for 3 hrs and then at 125° C. for 3 hrs in nitrogen atmosphere so that the epoxy resin was completely cured. The thus-formed cured composite epoxy-filter paper (Example E16) was smooth and flexible and uniformly covered on both sides with a thin layer of cured epoxy. The epoxy-filter paper composite sample E16 was semi-transparent in contrast to the filter paper itself which was opaque. The total thickness of the composite epoxy-filter paper was 0.23 mm. The thickness of the filter paper alone was 0.18 mm. The density of the filter paper was determined to be 0.51 g/cc while its pore volume (open space), as determined by filling the open space with water and measuring the weight gain, was ~77% of the total volume. This method of estimating the pore volume undoubtedly severely overestimates the pore volume because capillary action and the wetting of the fibers by water causes swelling of the paper beyond its dry volume. Nevertheless it is useful in comparing papers of different density. The oxygen permeability of E16 was measured with a commercial instrument (OX-TRAN 2/60, MOCON). The mean value of three replicate measurements with different samples was 9.65 cc.mil/ $m^2$.day.atm. The corresponding oxygen permeability value for a pristine epoxy polymer film (not encapsulating any clay film) was 98.9 cc.mil/$m^2$.day.atm, while that of the pristine filter paper was essentially infinite (>$10^6$) in comparison to the permeability of the pristine polymer and the polymer-fabric composite. The epoxy-filter paper composite film E16 showed approximately a 10-fold reduction in permeability (reaching the detection limits of the oxygen permeability instrument) compared to the pristine, unmodified epoxy polymer film. The oxygen permeability results are listed in Table 2.

Example 17 was prepared by using the same method as in Example 16, except that the impregnated paper was a Printing Paper (from HammerMill Co.) with a thickness of 0.10 mm. The density of the printing paper was determined 0.77 g/cc while its pore volume (open space) was ~65% of the total volume. The final cured composite epoxy-filter paper was flexible and smooth and had a thickness of 0.14 mm. The epoxy-printing paper composite sample E17 was semi-transparent in contrast to the printing paper itself which was opaque. The oxygen permeability of E17 was 4.13 cc.mil/$m^2$.day.atm. The epoxy-printing paper composite film E17 showed more than 10 times reduced permeability (reaching the detection limits of the oxygen permeability instrument) compared to the pristine, unmodified epoxy polymer film. The oxygen permeability results are listed in Table 2.

Example 18 was prepared by using the same method as in Example 16, except that the impregnated paper was a Tracing Paper (Bienfang Commercial Art Papers, Parchment 100) with a thickness of 0.05 mm. The density of the tracing paper was determined 0.89 g/cc while its pore volume (open space) was ~63% of the total volume. The final cured composite epoxy-tracing paper was smooth and flexible and had a thickness of 0.085 mm. Both the epoxy-tracing paper composite sample E18 and the tracing paper itself were semi-transparent. The oxygen permeability of E18 was 0.5 cc.mil/$m^2$.day.atm. The epoxy-tracing paper composite film E18 showed approximately 2–3 orders of magnitude reduced permeability compared to the pristine, unmodified epoxy polymer film. The oxygen permeability results are listed in Table 2.

EXAMPLES 19–23

Examples 19–23 apply the concept of polymer clay fabric composite formation as a means of greatly improving the barrier properties of thermoplastic polymers. The thermal plastic polymers used in these examples were low-density polyethylene (LDPE) and high-density polyethylene (HDPE) while the fabrics used to form the composites were made of pre-cast homoionic inorganic smectite clay fabric films.

The unmodified LDPE films were prepared by hot-pressing commercial LDPE beads at 145° C. for 10 min under a pressure of 10,000 kPa. The temperature was lowered slowly and the pressure load was not released until the press was cooled down to room temperature. In this way, flat, smooth, continuous LDPE films were prepared with a thickness of 0.30 mm. The thickness of the films depended on the initial number of the LDPE beads used and the load applied. The composite LDPE-clay film (Example E19) was prepared by hot-pressing a self supporting sodium-montmorillonite fabric (similar to E1) with thickness of 35 µm between two of the above unmodified LDPE films at 145° C. for 5 min under minimum applied pressure. The system was then cooled down to room temperature gradually. In this way, a smooth, continuous, semi-transparent, flexible, composite film was produced. The total thickness of the LDPE-E19 clay fabric film composite sheet was 0.50 mm. The thickness of the composite film, for a certain applied pressure load, could be varied depending on the relative ratio (mass or volume) of the LDPE layer to the clay fabric; the lower the above ratio the thinner the final LDPE-clay composite film. The oxygen permeability of E19 was 27.6 cc.mil/$m^2$.day.atm. The corresponding oxygen permeability value for the pristine LDPE polymer film was 4,407 cc.mil/$m^2$.day.atm, while for the pristine clay fabric film it was >6×$10^3$ cc.mil/$m^2$.day.atm. The composite LDPE-clay film E19 showed more than 2 orders of magnitude reduced permeability compared to the pristine, unmodified LDPE polymer film. The oxygen permeability results are listed in Table 3.

Example 20 (E20) was prepared by using the same method with E19 except that the clay fabric encapsulated in the LDPE polymer was the homoionic inorganic lithium-fluorohectorite clay film of example E6. The total thickness of the composite LDPE-clay film E20 was 0.50 mm. The oxygen permeability of E20 was 184.3 cc.mil/$m^2$.day.atm, while the oxygen permeability of the pristine clay fabric film was >1×$10^4$ cc.mil/$m^2$.day.atm. The composite LDPE-clay fabric film E20 showed more than 1 order of magnitude reduced permeability compared to the pristine, unmodified LDPE polymer film. The oxygen permeability results are listed in Table 3.

The preparation of the composite high-density polyethylene (HDPE)-clay fabric films of Examples E21 and E22 was similar to that applied for E19 and E20, except that the pristine, unmodified HDPE polymer was in film form rather than in bead form. The thickness of the commercially available HDPE film was 0.05 mm. For the preparation of Example 21 (E21), a homoionic inorganic sodium-montmorillonite clay film (similar to E1) with thickness of 35 µm was impregnated with HDPE while for the preparation of Example 22 (E22) the clay film used was the homoionic inorganic lithium-fluorohectorite E6. The total thickness of E21 was 0.13 mm and of E22 was 0.17 mm. The thickness of the HDPE-clay composite films, for a certain applied pressure load, could vary depending on the ratio (mass or volume) of the HDPE layer to the clay layer; the lower the above ratio the thinner the final HDPE-clay composite film. The oxygen permeability of E21 was 32.9 cc.mil/$m^2$.day.atm and of E22 was 4.9 cc.mil/$m^2$.day.atm. The corresponding oxygen permeability value for the pristine HDPE polymer film was 2,130 cc.mil/$m^2$.day.atm. The oxygen permeability of the composite HDPE-clay film E21 was reduced by 2 orders of magnitude compared to pristine HDPE polymer film, while the permeability of E22 was reduced by approximately 3 orders of magnitude. The oxygen permeability results are listed in Table 3.

For the preparation of the composite of Example 23, the HDPE-supported clay fabric film of Example 3 was impregnated with HDPE by hot-pressing an HDPE film on the surface of the HDPE-supported clay film, similar to methodology used in Examples 19–22. The resulting composite HDPE-clay fabric film was smooth and flexible, semi-transparent and had a thickness of 0.11 mm (the thickness of the supported clay film was 20 µm, see Example 3). The oxygen permeability of E23 was 96.4 cc.mil/$m^2$.day.atm and it was more than 1 order of magnitude lower compared to the pristine HDPE polymer film. The oxygen permeability results are listed in Table 3.

EXAMPLES 24–26

Examples 24–26 demonstrate the effectiveness of polymer-fabric film composite formation as a means of greatly improving the barrier properties of thermoplastic polymers using commercial paper, particularly tracing paper, as the fabric film component of the composite. The polymer used in these examples was the high-density polyethylene (HDPE) while the types of papers were Filter Paper, Printing Paper and Tracing Paper, similar to those used in Examples 16–18.

The composite HDPE-paper films were prepared by hot-pressing the different types of papers between two films of HDPE, following the procedure of Examples 21 and 22. The thickness of the composite film prepared from the filter paper (Example 24) was 0.18 mm, of the composite prepared from the printing paper (Example 25) was 0.16 mm and of the composite prepared from the tracing paper (Example 26) was 0.12 mm. The composite films were smooth and flexible. Their thickness, for a certain applied pressure load, could be varied depending on the ratio (mass or volume) of the HDPE layer to the paper layer; the lower the above ratio the thinner the final HDPE-paper composite film. The oxygen permeability of E24 was very high and outside the range of the Mocon Instrument, indicating that insufficient polymer was present to penetrate the voids in the filter paper fabric. The oxygen permeability of sample E25 was 1,445 cc.mil/m$^2$.day.atm. and the permeability of sample E26 was 0.86 cc.mil/m$^2$.day.atm. The corresponding oxygen permeability value for the pristine HDPE polymer film was 2,130 cc.mil/m$^2$.day.atm, while the permeability of all the pristine papers too large to measure with the Mocon instrument (>10$^6$ cc.mil/m$^2$.day.atm.). The reduction of oxygen permeability of the HDPE-paper composites compared to the pristine HDPE film was ~30% for the composite E25 prepared from the printing paper and more than 3 orders of magnitude for the tracing paper based composite E26. The oxygen permeability results are listed in Table 3.

EXAMPLE 27

This example illustrates that the polymer-fabric composite films of the present invention also have excellent barrier properties toward molecules as small as hydrogen.

A cured epoxy polymer-tracing paper composite sheet was prepared in duplicate by the method descried in Example 18. The average thickness of the two composite compositions was 0.00230±0.00020 inches and the average density was 1.10±0.08 g/cc. The duplicate samples were submitted to Dr. Eric Stokes of Southern Research Institute of Birmingham, Ala. for the determination of hydrogen permeability at ambient temperature. The average permeability was found to be 1.97±0.08×10$^{-18}$ moles/m·s·Pa, where m=meters, s=seconds, Pa=pascals. Multiplying by 7.75×10$^{19}$ converts the permeability to 15.3 cc.mil/m$^2$·day·atm. In comparison, the pristine epoxy polymer exhibited a hydrogen permeability of 3.63×10$^{-16}$ moles/m·s·Pa or 28.1×10$^2$ cc.mil/m$^2$·day·atm. Thus, the barrier properties were improved by a factor of more than 100. Composite films comprised of clay elongate particles can be expected to provide comparable improvements in barrier properties.

TABLE 1

Compositional analysis of the heterostructured mixed organic-inorganic cation smectite clay fabric films (CHN, SEM-EDS)

| Samples | % ion-exchange of inorganic cation (Na$^+$ or Li$^+$) with onium ions | |
|---|---|---|
| | (CHN) | (EDS) |
| Na$^+$-onium ions montmorillonite, E7a (5 min/2 min)$^1$ | 0.8 | 23 |
| Na$^+$-onium ions montmorillonite, E7b (30 min/unwashed) | 2.9 | — |
| Na$^+$-onium ions montmorillonite, E7b (30 min/2 min) | 1.6 | 38 |
| Na$^+$-onium ions montmorillonite, E7c (2 hrs/2 min) | 2.8 | 50 |
| Na$^+$-onium ions montmorillonite, E7d (6 hrs/1 min) | 3.5 | 62 |
| Li$^+$-onium ions montmorillonite, E8a (5 min/2 min) | 4.7 | — |
| Li$^+$-onium ions montmorillonite, E8b (30 min/unwashed) | 19.3 | — |
| Li$^+$-onium ions montmorillonite, E8b (30 min/1 min) | 8.0 | — |

$^1$The first value in parentheses refers to the time allowed for ion-exchange of the inorganic cation clay fabric film by the diprotonated diamine D-2000 and the second value refers to the time of washing of the ion-exchanged film with ethanol

TABLE 2

Oxygen Permeability data of the composite epoxy-fabric films, the fabric being a clay fabric film as in Examples 9–15 or a paper as in Examples 16–18

| Sample (Composite Film) | Thickness of Clay or (mm) | Thickness of Composite (mm) | Oxygen Permeability (cc · mil/m$^2$ · d) |
|---|---|---|---|
| Pristine Epoxy | — | 0.20 (0.0%)$^{(2)}$ | 98.9 |
| Epoxy-(Na$^+$-mont.), E9 | 0.06 | 0.11 (63%) | ≦0.1 |
| Epoxy-(Na$^+$-mont.), E10 | 0.035 | 0.10 (51%) | 0.97 |
| Epoxy-(H$^+$-mont.), E11 | 0.035 | 0.07 (55%) | 11.3 |
| Epoxy-(H$^+$-mont.), E11a | 0.035 | 0.15 (30%) | 10.5 |
| Epoxy-(Li$^+$-fluor.), E12 | 0.065 | 0.15 (66%) | 1.16 |
| Epoxy-(Li$^+$-fluor.), E12a | 0.065 | 0.31 (27%) | ≦0.1 |
| Epoxy-(Na$^+$-mont.), E13$^{(1)}$ | 0.010 | 0.25 (5%) | ≦0.1 |
| Epoxy-(Na$^+$-onium ions mont.), E14 | 0.06 | 0.12 (57%) | 0.28 |
| Epoxy-(Na$^+$-onium ions mont.), E14a | 0.035 | 0.09 (55%) | ≦0.1 |
| Epoxy-(Li$^+$-onium ions fluor.), E15 | 0.065 | 0.14 (72%) | ≦0.1 |
| Epoxy-Filter Paper, E16 | 0.18 | 0.23 (37%) | 9.65 |
| Epoxy-Printing Paper, E17 | 0.10 | 0.14 (43%) | 4.13 |
| Epoxy-Tracing Paper, E18 | 0.05 | 0.085 (44%) | 0.50 |

$^{(1)}$The composite epoxy-clay film of Example 13 was prepared from an epoxy-supported clay fabric film, while the rest of the composite samples in Table 2 were prepared from self-supported clay fabric films
$^{(2)}$The number in parentheses corresponds to the weight percent of clay or paper in the epoxy composite specimens.

TABLE 3

Oxygen Permeability data of the polyethylene (LDPE or HDPE)-fabric composite films, the fabric being a clay film as in Examples 19–23 or a paper as in Examples 24–26

| Sample (Composite Film) | Thickness of Clay or Paper (mm) | Thickness of Composite Polymer - (mm) | Oxygen Permeability (cc · mil/m$^3$) |
|---|---|---|---|
| Pristine LDPE | — | 0.30 (0.0%)[2] | 4,407 |
| LDPE-(Na$^+$-mont.), E19 | 0.035 | 0.50 (12%) | 27.6 |
| LDPE-(Li$^+$-fluor.), E20 | 0.065 | 0.50 (17%) | 184.3 |
| Pristine HDPE | — | 0.05 | 2,130 |
| HDPE-(Na$^+$-mont.), E21 | 0.035 | 0.13 (42%) | 32.9 |
| HDPE-(Li$^+$-fluor.), E22 | 0.065 | 0.17 (41%) | 4.9 |
| HDPE-(Na$^+$-mont.), E23 | 0.020 | 0.11 (20%) | 96.4 |
| HDPE-Filter Paper, E24 | 0.18 | 0.18 (49%) | >10$^4$ |
| HDPE-Printing Paper, E25 | 0.10 | 0.17 (46%) | 1,445 |
| HDPE-Tracing Paper, E26 | 0.05 | 0.12 (31%) | 0.86 |

[1]The composite LDPE-clay film of Example 23 was prepared from a LDPE-supported clay film, while the rest of the composite samples in Table 3 were prepared from self-supported clay films
[2]The number in parentheses corresponds to the weight percent of clay or paper in the polyethylene composite specimens.

It is intended that the foregoing description be only illustrative of the present invention and that the present invention be limited only by the hereinafter appended claims.

TABLE 2

Oxygen Permeability data of the composite epoxy - fabric films, the fabric being a clay fabric film as in Examples 9–15 or a paper as in Examples 16–18

| Sample (Composite Film) | Thickness of Clay or (mm) | Thickness of Composite (mm) | Oxygen Permeability (cc · mil/m$^2$ · d) |
|---|---|---|---|
| Pristine Epoxy | — | 0.20 (0.0%)[2] | 98.9 |
| Epoxy - (Na$^+$-mont.), E9 | 0.06 | 0.11 (63%) | ≦0.1 |
| Epoxy - (Na$^+$-mont.), E10 | 0.035 | 0.10 (51%) | 0.97 |
| Epoxy - (H$^+$-mont.), E11 | 0.035 | 0.07 (55%) | 11.3 |
| Epoxy - (H$^+$-mont.), E11a | 0.035 | 0.15 (30%) | 10.5 |
| Epoxy - (Li$^+$-fluor.), E12 | 0.065 | 0.15 (66%) | 1.16 |
| Epoxy - (Li$^+$-fluor.), E12a | 0.065 | 0.31 (27%) | ≦0.1 |
| Epoxy - (Na$^+$-mont.), E13[1] | 0.010 | 0.25 (5%) | ≦0.1 |
| Epoxy - (Na$^+$-onium ions mont.), E14 | 0.06 | 0.12 (57%) | 0.28 |
| Epoxy - (Na$^+$-onium ions mont.), E14a | 0.035 | 0.09 (55%) | ≦0.1 |
| Epoxy - (Li$^+$-onium ions fluor.), E15 | 0.065 | 0.14 (72%) | ≦0.1 |
| Epoxy - Filter Paper, E16 | 0.18 | 0.23 (37%) | 9.65 |
| Epoxy - Printing Paper, E17 | 0.10 | 0.14 (43%) | 4.13 |
| Epoxy - Tracing Paper, E18 | 0.05 | 0.085 (44%) | 0.50 |

We claim:

1. An container with a confined space with a low permeability to a gas or a vapor which comprises:
   a confined space formed at least in part with a composite composition which comprises: a sheet of a preformed porous fabric layer of overlapping, separate elongate members, which form the fabric layer, wherein each of the elongate members have a length, width or thickness which is less than about ten micrometers; and a water-insoluble polymer which has been impregnated into the fabric layer, wherein the composite composition has a transmission rate to oxygen that is less than one-tenth the transmission rate for the fabric layer alone and less than one-fifth the transmission rate for the polymer alone without the fabric layer, wherein the composite composition provides a barrier between opposed sides of the sheet in the enclosure.

2. The container of claim 1 wherein the polymer comprises a water-insoluble thermoset polymer.

3. The container of claim 1 wherein the elongate members are platey particles.

4. The container of claim 1 wherein the elongate members are fibers or flattened fibers.

5. The container of claim 1 wherein the polymer comprises a water-insoluble thermoplastic.

6. The container of claim 1 wherein the composition has a transmission rate to oxygen of less than about 100 cc.mil/m$^2$day.atm.

7. The method of claim 1 wherein the polymer impregnated fabric layer is at least 25% by weight of the elongate particle members.

8. The container of claim 1 wherein the fabric layer is self-supporting without the water-insoluble polymer.

9. A package for enclosing a material which comprises as part of the material for forming the package a composite composition which comprises:
   (a) a preformed, porous fabric layer of overlapping, elongate members which form the fabric layer, wherein each of the elongate members have a length, width or thickness which is less than about ten micrometers; and (b) a water-insoluble polymer which has been impregnated into the fabric layer, wherein the composite composition has a transmission rate to oxygen in a direction orthogonal to the layer that is less than one-tenth the transmission rate for the fabric layer alone and less than one-fifth the transmission rate for the polymer alone without the fabric layer.

10. The package of claim 9 wherein the polymer comprises a water-insoluble thermoset polymer.

11. The package of claim 9 wherein the elongate members are platey particles.

12. The package of claim 9 wherein the elongate members are fibers or flattened fibers.

13. The package of claim 9 wherein the polymer is a water-insoluble thermoplastic.

14. The package of claim 9 wherein the fabric layer is at least 25% by weight of the composition.

* * * * *

UNITED STATES PATENT AND TRADEMARK OFFICE
CERTIFICATE OF CORRECTION

PATENT NO. : 7,074,469 B2
APPLICATION NO. : 10/393123
DATED : July 11, 2006
INVENTOR(S) : Thomas J. Pinnavaia, Konstantinos Triantafyllidis and Peter C. LeBaron It is certified that error appears in the above-identified patent and that said Letters Patent is hereby corrected as shown below:

Column 19, Table 2, Table 2 needs to be deleted.

Column 20, Table 3, Table 3 and footnotes need to be deleted.

Signed and Sealed this

Thirteenth Day of March, 2007

JON W. DUDAS
*Director of the United States Patent and Trademark Office*